US007920509B2

(12) United States Patent
Gazzard

(10) Patent No.: US 7,920,509 B2
(45) Date of Patent: Apr. 5, 2011

(54) REMOTE NODE ACCESS IN WIRELESS TELECOMMUNICATION SYSTEMS

(75) Inventor: Daryl R. Gazzard, Alpharetta, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 1375 days.

(21) Appl. No.: 10/225,962

(22) Filed: Aug. 22, 2002

(65) Prior Publication Data

US 2004/0037239 A1 Feb. 26, 2004

(51) Int. Cl.
*H04Q 7/00* (2006.01)
(52) U.S. Cl. .......................................... 370/328; 370/401
(58) Field of Classification Search .................. 370/328, 370/329, 338, 401, 410
See application file for complete search history.

(56) References Cited

U.S. PATENT DOCUMENTS

| | | | | |
|---|---|---|---|---|
| 6,198,921 | B1 * | 3/2001 | Youssefzadeh et al. | 455/428 |
| 6,351,213 | B1 * | 2/2002 | Hirsch | 340/506 |
| 6,442,401 | B1 * | 8/2002 | Behan | 455/552.1 |
| 6,463,290 | B1 * | 10/2002 | Stilp et al. | 455/456.1 |
| 6,684,079 | B1 * | 1/2004 | Aretz et al. | 455/502 |
| 6,724,746 | B1 | 4/2004 | Linden | |
| 6,729,929 | B1 | 5/2004 | Sayers et al. | |
| 6,785,543 | B2 * | 8/2004 | Karabinis | 455/427 |
| 7,082,115 | B2 | 7/2006 | Bauer et al. | |
| 7,164,660 | B2 * | 1/2007 | Baker et al. | 370/318 |
| 2002/0052191 | A1 * | 5/2002 | Bristow et al. | 455/405 |
| 2002/0186691 | A1 * | 12/2002 | Bristow et al. | 370/389 |
| 2002/0191595 | A1 * | 12/2002 | Mar et al. | 370/352 |
| 2003/0013489 | A1 * | 1/2003 | Mar et al. | 455/560 |
| 2003/0108015 | A1 * | 6/2003 | Li | 370/338 |

* cited by examiner

*Primary Examiner* — Ricky Ngo
*Assistant Examiner* — Christine Ng
(74) *Attorney, Agent, or Firm* — Parks IP Law LLC; Mickki D. Murray, Esq.

(57) ABSTRACT

A system and method that provides remote access to nodes in a wireless telecommunication system comprises sending a first message from an operations node in the wireless telecommunication system to a packet interface. The first message may be dynamically directed to a first of the nodes in the wireless telecommunication system. This may be accomplished by dynamically directing the first message using an unallocated channel, using an allocated but inactive channel, using an active channel, or prioritizing the first message in the active channel.

34 Claims, 3 Drawing Sheets

REMOTE NODE ACCESS IN WIRELESS TELECOMMUNICATION SYSTEMS

DESCRIPTION OF THE INVENTION

1. Field of the Invention

The invention relates generally to systems and methods for remote node access in wireless telecommunication systems, and more particularly, to systems and methods for remote node access when performing operation and maintenance on nodes in a wireless telecommunication system.

2. Background of the Invention

The development of modern mobile cellular telecommunications systems can be divided into three generations, the first generation (1G), the second generation (2G), and the third generation (3G). 1 G systems, introduced in the late 1970s and early 1980s, were analog systems such as advanced mobile phone service (AMPS), total access communication system (TACS), and nordic mobile telephone (NMT). 1G systems were used primarily for voice telecommunications.

2G systems, starting in the 1990s, used digital encoding such as time division multiple access (TDMA), global system for mobile communications (GSM), and code division multiple access (CDMA). TDMA is a satellite and cellular phone technology that incorporates multiple digital signals onto a single high-speed channel. In TDMA, each channel is divided into multiple sub-channels providing service to multiple users instead of one. Thus, TDMA multiplies the capacity of the original analog methods such as frequency division multiple access (FDMA). FDMA puts each call on a separate frequency, while TDMA uses a narrow band that is typically 30 kHz wide and 6.7 milliseconds long and is split time-wise into multiple time slots. With TDMA, each conversation gets the radio for a fraction of the time as compared to FDMA. This is possible because in TDMA, the data is converted to digital information and compressed so that it takes up significantly less transmission space. Therefore, TDMA has more capacity than an analog system using FDMA and the same number of channels.

GSM is based on TDMA. However, GSM normally refers to an entire network, not just an air interface. Developed in the 1980s and predominantly used in Europe, existing GSM system operate in the 900 MHz and 1.8 GHz bands in Europe and the 1.9 GHz PCS band in the U.S. GSM phones may use a subscriber identity module (SIM) smart card that contains user account information. GSM phones are automatically programmed by plugging in the SIM card, allowing GSM phones to be used interchangeably in situations such as renting or borrowing. In addition, GSM includes short messaging service (SMS) that enables text messages up to 160 characters in length to be exchanged from GSM phones. GSM supports data transfer rates of 9.6 Kbps to packet networks.

CDMA is a method for transmitting simultaneous signals over a shared portion of the spectrum. An application of CDMA is the digital cellular phone technology developed by QUALCOMM Incorporated of 5775 Morehouse Drive, San Diego, Calif. 92121. This technology commonly operates in the 800 MHz band and 1.9 GHz PCS band. Unlike GSM and TDMA that divide the frequency spectrum into different time slots, CDMA uses a spread spectrum technique to assign a code to each conversation. After the speech coder/decoder converts an analog voice signal into digital, CDMA spreads the voice stream over the full bandwidth of the CDMA channel, coding each stream separately so it can be decoded at the receiving end. Due to this spread spectrum technique, CDMA transmissions have been used by the military for secure phone calls because unlike FDMA and TDMA methods, CDMA's wide spreading signal makes it difficult to detect and jam.

2G systems, with the exception of SMS of GSM, have been used mostly for voice. As a bridge between 2G systems and 3G systems, 2G+ (also known as 2.5G) techniques have been developed to improve the data speed for e-mail and Internet access. These bridging technologies include general packet radio service (GPRS), enhanced data rates for global evolution (EDGE), and improved data rates for CDMA (IS-95B and HDR).

GPRS is an enhancement for GSM that supports packetized data. GPRS enables a continuous flow of Internet Protocol data packets over the telecommunication system for applications such as Web browsing and file transfer. GPRS differs from SMS because SMS is limited to messages of 160 bytes in length, GPRS has no such limit. Additionally, those skilled in the art will appreciate that EDGE is an enhancement to the GSM and TDMA wireless telecommunications systems that increases data throughput.

3G is defined by the International Telecommunications Union (ITU) under the IMT-2000 global framework. 3G is designed for both voice and high-speed multimedia data. The goals of 3G include high-quality audio and video, and advanced global roaming to enable users to seamlessly pass between any wireless system in the world including satellite, cellular, and in-house systems. It is known that 3G systems have been implemented in North America under CDMA-2000, in Europe under Universal Mobile Telecommunications System (UMTS), and Japan under NTT DoCoMo.

With the advent and steady growth of wireless telecommunications, wireless telecommunication systems will increasingly be utilized for not only voice data, but also for sending and receiving packetized data. In an effort to lower operating costs, increase system availability, and increase value for its subscribers, wireless telecommunications providers wish to perform remote maintenance on nodes contained within their wireless telecommunication systems. Wireless telecommunication providers realize a cost savings by performing remote maintenance for problems that do not require physical maintenance on nodes within the wireless telecommunication system.

Therefore, the need to efficiently provide remote node access for wireless telecommunication systems has become a common need for many wireless telecommunication providers. More specifically, efficiently providing remote node access when performing remote operation and maintenance on wireless telecommunication systems has become a critical service for many wireless telecommunication providers. This is because in an increasingly competitive environment, meeting and exceeding the expectations of subscribers or others who receive services is essential for a wireless telecommunication provider.

One solution to the remote node access for wireless telecommunication systems problem is for dedicated hardware to be placed at nodes in the telecommunication system and to communicate with the dedicated hardware via dedicated channels on T-1 lines going to the remote nodes. Great inefficiencies are created in this procedure because, for example, at least a channel on the T-1 lines normally dedicated to subscriber traffic is perpetually consumed regardless of whether the channel is being actively used for remote access to a remote node on the telecommunication system. In addition, this conventional solution assumes the specific dedicated channel on the T-1 line is available at the node in question. Moreover, dedicated hardware must be purchased and installed. Accordingly, efficiently providing remote node access for wireless telecommunication systems remains an elusive goal.

Thus, there remains a need for efficiently providing remote node access for wireless telecommunication systems in a way that is flexible and without the need for dedicated hardware and communications channels. In addition, there remains a need for remote node access for performing operation and maintenance on wireless telecommunication systems.

SUMMARY OF THE INVENTION

Consistent with the present invention, remote access to nodes on a wireless communication system method and system are provided that avoid problems associated with prior art remote access to nodes on a wireless communication systems as discussed herein above.

In one aspect, an improved method for providing remote access to nodes in a wireless telecommunication system comprising sending a first message from an operations node in the wireless telecommunication system to a packet interface, and dynamically directing the first message to a first of the nodes in the wireless telecommunication system.

In another aspect, an improved method for providing remote access to nodes in a wireless telecommunication system comprising sending a second message from a first of the nodes in the wireless telecommunication system to a packet interface, and dynamically directing the second message to the operations node in the wireless telecommunication system.

In yet another aspect, an improved system for providing remote access to nodes in a wireless telecommunication system comprises an operations node configured for sending a first message to a first of the nodes in the wireless telecommunication system, and a packet interface in communication with the operation node, the packet interface configured for receiving the first message and dynamically directing the first message to the first node in the wireless telecommunication system.

In yet another aspect, a computer-readable medium on which is stored a set of instructions for providing remote access to nodes in a wireless telecommunication system, which when executed perform stages comprising sending a first message from an operations node in the wireless telecommunication system to a packet interface, and dynamically directing the first message to a first of the nodes in the wireless telecommunication system.

Both the foregoing general description and the following detailed description are exemplary and are intended to provide further explanation of the invention as claimed.

BRIEF DESCRIPTION OF THE DRAWINGS

The accompanying drawings provide a further understanding of the invention and, together with the detailed description, explain the principles of the invention. In the drawings.

DESCRIPTION OF THE EMBODIMENTS

Figure 1:
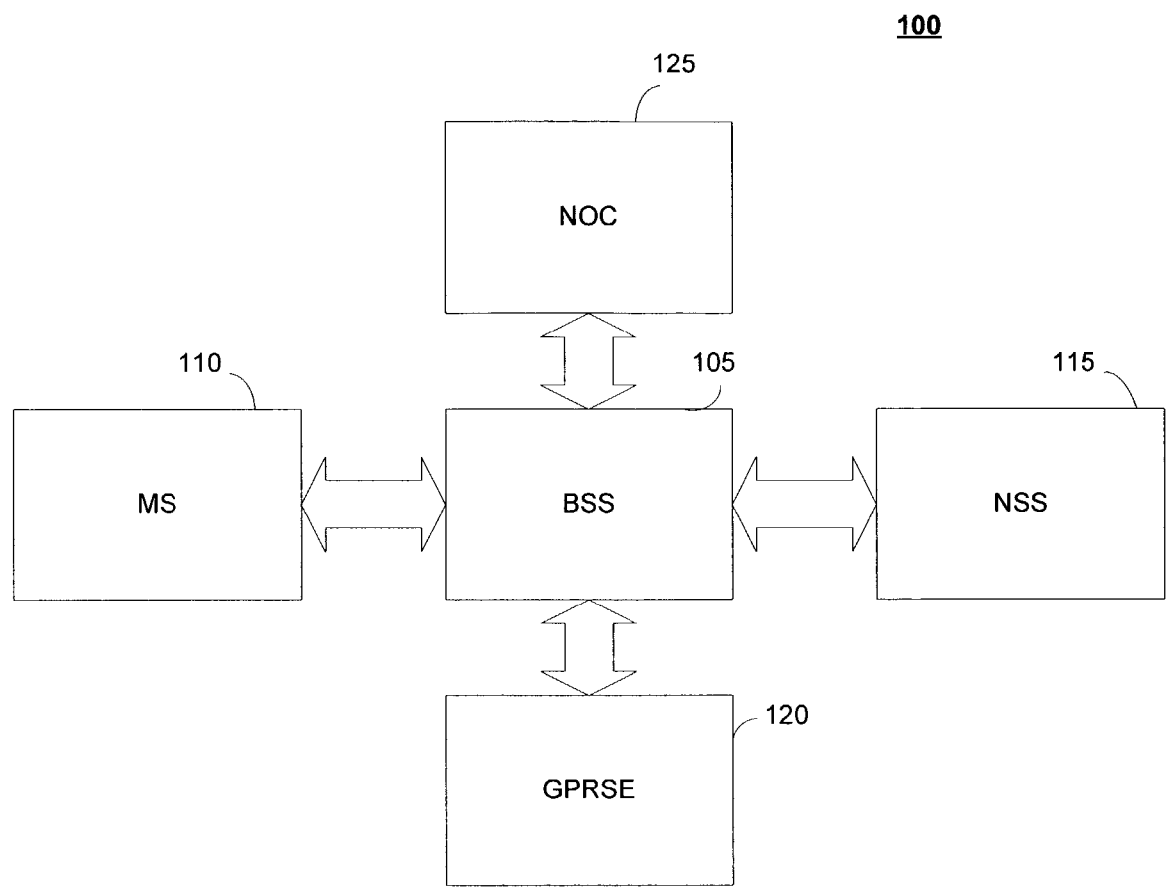
FIG. 1 is a functional block diagram of an exemplary system for providing remote access to nodes on a wireless telecommunication system consistent with an embodiment of the present invention.

Reference will now be made to various embodiments according to this invention, examples of which are shown in the accompanying drawings and will be obvious from the description of the invention. In the drawings, the same reference numbers represent the same or similar elements in the different drawings whenever possible.

Consistent with an embodiment of the present invention, an improved system for providing remote access to nodes in a wireless telecommunication system comprises an operations node in the wireless telecommunication system, the operations node configured for sending a first message, and a packet interface in the wireless telecommunication system, the packet interface configured for dynamically directing the first message to a first node in the wireless telecommunication system.

As herein embodied and illustrated in FIG. 1, an exemplary system for providing remote access to nodes on a wireless telecommunication system 100 may comprise a base station subsystem (BSS) 105, a mobile station (MS) 110, a network and switching subsystem (NSS) 115, a general packet radio service element (GPRSE) 120, and a network operation center (NOC) 125. The elements of system 100 will be described in greater detail below with respect to FIG. 2. Consistent with an embodiment of the invention, the first node may comprise BSS 105 or a BTS 210 (as described below with respect to FIG. 2), the operations node may comprise NOC 125 or a regional network operations center (RNOC) 265 (as described below with respect to FIG. 2), and the packet interface may comprise a PCU 215 (as described below with respect to FIG. 2). Those skilled in the art, however, will appreciate that other elements of system 100 may comprise the first node, the operations node, and the packet interface.

System 100 may utilize GSM technology enhanced with GPRS in embodiments of the present invention. Those skilled in the art will appreciate, however, that other wireless telecommunication standards may be employed such as, for example, FDMA, TDMA, CDMA, CDMA 2000, UTMS, EDGE, without departing from the spirit of the invention.

Wireless telecommunications may include radio transmission via the airwaves, however, those of ordinary skill in the art will appreciate that various other telecommunication techniques can be used to provide wireless transmission including infrared line of sight, cellular, microwave, satellite, bluetooth packet radio, and spread spectrum radio. Wireless data may include, but is not limited to, paging, text messaging, e-mail, Internet access, instant messaging, and other specialized data applications specifically excluding or including voice transmission.

Figure 2:
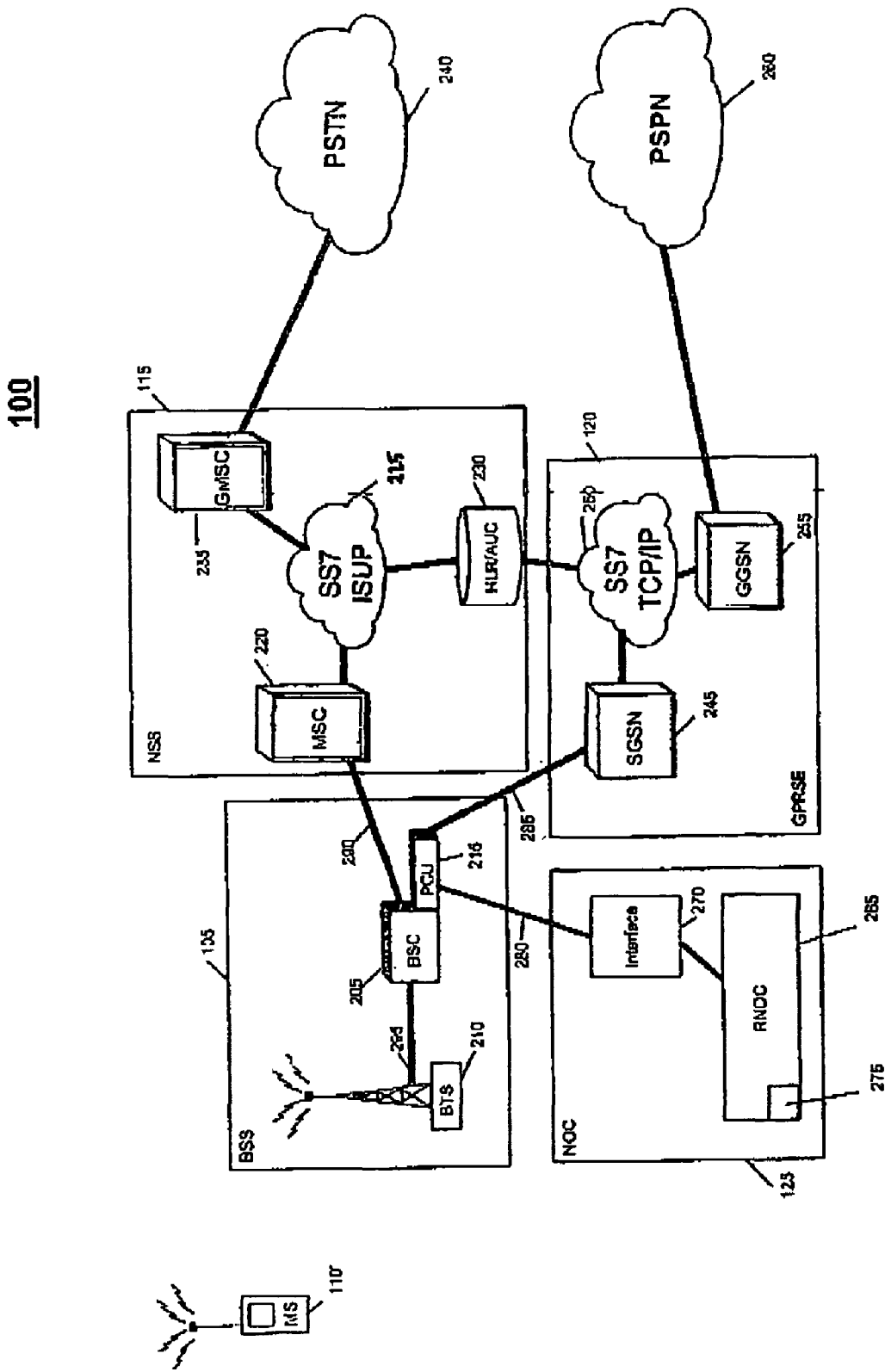
FIG. 2 is a functional block diagram of an exemplary system for providing remote access to nodes on a wireless telecommunication system of FIG. 1 shown in greater detail consistent with an embodiment of the present invention.

As shown in FIG. 2, BSS 105 may comprise, for example, a base station controller (BSC) 205, base transceiver station (BTS) 210, and packet control unit (PCU) 215. BSS 105 connects to MS 110 through a radio interface and connects to NSS 115 through interface 290. BSC 205 controls BTS 210 and may control a plurality of other base transceiver stations in additional to BTS 210. BTS 105 may comprise radio transmission and reception equipment located at an antenna site. Associated with BSS 105, a transcoder/rate adaption unit (TRAU) (not shown) carries out speech encoding and speech decoding and rate adaptation for transmitting data. As a subpart of BTS 210, the TRAU may be located away from BTS 210, for example, at a mobile switching center located in NSS 115. When the TRAU is located in this way, the low transmission rate of speech code channels allows more compressed transmission between BTS 210 and the TRAU.

PCU 215 connects BSS 105 to GPRSE 120, which allows, for example, the Internet to link with MS 110. PCU 215 adds level 2 functions of GPRS such as data aware radio link control (RLC) and the MAC protocol layer as well as performing radio resource configuration and channel assignment.

GSM may use open system interconnection (OSI). There are several common interfaces defined by OSI such as a common radio interface (referred to as air interface) used between MS 110 and BTS 210, and an A-bis interface 295 used between BTS 210 and BSC 205. With common interfaces such as those defined by OSI, a telecommunication system operator can utilize and interchange equipment of various manufactures when implementing communication systems. The difference between interface and protocol is that an interface represents the point of contact between two adjacent entities (equipment or systems) and a protocol provides information flows through the interface. For example, the GSM radio interface is the transit point for information flow pertaining to several protocols.

Interface 290 between NSS 115 and BSS 105, interface 285 between PCU 215 and SGSN 245, and interface 280 between PCU 215 and RNOC 265, may comprise T-1 lines using X.25 or TCP/IP protocol for example. In the United States, leased T1 lines are favored liar internetworking remote locations rather than public data networks. However, frame relay, which was modeled after X.25, has been successful as a public data network technology for meeting high bandwidth demands. Interface 280 may be used for operations and maintenance activates and messages. Some communications on interface 280 may be converted from X.25 to TCP/IP by interface 270 if X.25 is used on interface 280.

MS 110 may comprise a mobile phone 110', a personal computer, a handheld computing device, a multiprocessor system, microprocessor-based or programmable consumer electronic device, a minicomputer, a mainframe computer, a personal digital assistant (PDA), a facsimile machine, a telephone, a pager, a portable computer, or any other device for receiving and/or transmitting information. MS 110 may utilize cellular telephone protocols such as wireless application protocol (WAP), or blue-tooth protocol. Such mobile systems may also be configured to permit the user to purchase products through a browser on a display of the mobile device. Those skilled in the art will appreciate that embodiments of the present invention are not limited to a particular form of mobile system or communications protocol. And those of ordinary skill in the art will recognize that other systems and components may be utilized within the scope and spirit of the invention.

MS 110 may be a stand-alone piece of equipment for certain services or support the connection of external terminals, such as the interface for a personal computer or facsimile machine. MS 110 may include mobile equipment (ME), such as mobile phone 110; or a subscriber identity module (SIM). The ME does not need to be personally assigned to one subscriber. GSM phones may use a SIM card that contains user account information, as GSM phones may be automatically programmed by plugging in the SIM card. This allows GSM phones to be-used interchangeably in situations such as renting or borrowing. When a subscriber's SIM is inserted into the ME of MS 110, all calls for the subscriber are delivered to MS 110. Thus, the ME is not associated with a particular number, but rather, is linked to the subscriber's SIM. In addition, GSM may include Short Messaging Service (SMS) that enables text messages up to 160 characters in length to be exchanged from GSM phones.

Still referring to FIG. 2, NSS 115 may comprise a mobile switching center (MSC) 220, a first network 225, a home location register/authentication center (HLR/AUC) 230, and a gateway mobile switching center (GMSC) 235. NSS 115 manages the communication between GSM subscribers, for example, a subscriber using MS 110', and other telecommunications users, for example, those using publicly switched telephone network (PSTN) 240. PSTN 240 may comprise, for example, the worldwide voice telephone network.

MSC 220 coordinates call set-up to and from GSM users such as those using MS 110'. MSC 220 may control several base station controllers such as, and similar to BSC 205. GMSC 235 is used to interface with external networks for communication with users outside of the wireless system, such users on PSTN 240.

HLR/AUC 230 may comprise a stand-alone computer without switching capabilities, a database which contains subscriber information, and information related to the subscriber's current location, but not the actual location of the subscriber. The AUC portion of HLR/AUC 230 manages the security data for subscriber authentication. Another sub-division of HLR/AUC 230 may include an equipment identity register (EIR) (not shown) which may store data relating to mobile equipment (ME).

NSS 115 may also include a visitor location register (VLR) (not shown). The VLR links to one or more mobile switching center located on other systems, temporarily storing subscription data of subscribers currently served by MSC 220. The VLR holds more detailed data than HLR/AUC 230. For example, the VLR may hold more current subscriber location information than the location information at HLR/AUC 230.

GMSC 235 is utilized to interface with PSTN 240. In order to set up a requested call, the call is initially routed to GMSC 235, that finds the correct home location register by knowing the director number of the GSM subscriber. GMSC 235 has an interface with an external network, such as PSTN 240, for gatewaying communications.

The elements of NSS 115 are connected using first network 225. First network 225 may comprise an intelligent network utilizing signal system 7 (SS7) in an ISDN user part (ISUP) protocol. SS7 is a global standard for telecommunications defined by the Telecommunication Standardization Sector of the International Telecommunication Union. The SS7 standard defines the procedures and protocol by which network elements in a public switched telephone network exchange information over a digital signaling network to effect wireless and wireline call setup, routing, and control. ISUP defines the protocol and procedures used to set-up, manage, and release trunk circuits that carry voice and data calls over a public switched telephone network. ISUP is used for both ISDN and non-ISDN calls. Calls that originate and terminate at the same switch do not use ISUP signaling.

As shown in FIG. 2, GPRSE 120 may comprise a serving GPRS service node (SGSN) 245, a second network 250, and a gateway GPRS service node (GGSN) 255. In order to implement GPRS, two new node types have been added to the conventional GSM network, GGSN 255 and SGSN 245. Also, the interfaces to the conventional GSM system may be augmented and an extra unit, such as PCU 215 that may be located in BSS 105 as described above, may be added.

SGSN 245 connects GPRSE 120 to BSS 105. SGSN 245 receives the traffic from mobile subscribers associated with BSS 115 and forwards the traffic to GGSN 255. SGSN 245 uses its links with HLR/AUC 230 to authenticate and bill subscribers, and may provide additional services such as data compression, session management and encryption.

GGSN 255 acts as a gateway to PSPN 260, most often a publicly switched packet network such as the Internet. Data is sent across the GPRS network to GGSN 255, un-encapsulated, and then forwarded to the next node. To the outside world GGSN 255 appears as just another router on the Internet. Common features of GGSN 255 include firewall/packet-filtering technologies and a dynamic host configuration protocol (DHCP) server to configure IP options of MS 110 as it logs onto the network. DHCP automatically assigns IP addresses to client stations logging onto a TCP/IP network. It eliminates having to manually assign permanent IP addresses. DHCP software typically runs in servers and is also found in network devices such as ISDN routers and modem routers that allow multiple users access to the Internet.

SGSN 245 and GGSN 255 are connected through second network 250. Second network 250 may employ SS7 as described above and use transmission control protocol/internet protocol (TCP/IP).

Still referring to FIG. 2, network operation center (NOC) 125 may comprise regional network operations center (RNOC) 265 and interface 270. RNOC 265 insures the efficient operation of system 100 and performs maintenance on the system when needed on nodes assigned to the geographical region within the control authority of RNOC 265. When maintenance not requiring physical intervention is required, software, such as a software module 275, may be executed, obtaining remote access to nodes on system 100 through interfaces 270 and 280. These nodes accessed, may include, for example, BTS 210. When obtaining remote access, messages may be sent through one or more channels (more generally called communication paths) not dedicated to operation data and maintenance data. For example, conventional systems typically require that at least one channel of a T-1 line between RNOC 265 and BSC 205 be dedicated to operation and maintenance use. Conventional systems are problematic at least because the channel or channels dedicated to operations and maintenance use cannot be used for any other traffic on the system, including traffic associated with subscriber communications.

Consistent with an embodiment of the invention, for example, an event recording device within BTS 210 can record data with respect to the operation of BTS 210. A first message may be sent from RNOC 265, through interface 270 and interface 280, to PCU 215 and BSC 205 requesting that data from the event recording device within BTS 210 be sent to RNOC 265. The first message, for example, may comprise packetized data. PCU 215 may receive the first message and dynamically direct the first message from PCU 215 to BTS 210. Dynamically directing the first message will be described in greater detail below.

TCP/IP may be used with both RNOC 265 and the event recording device with both having IP addresses. The recording device may place packetized data corresponding to a second message onto system 100 in response to the first message. The second message may comprise information or other data recorded by the event recording device. This packetized data placed on system 100 may appear to system 100 to be normal subscriber traffic, for example, data sent from MS 110 bound for PSPN 260. When the second message from the event recorder reaches PCU 215, however, PCU 215 recognizes the packeized data corresponding to the second message as data bound for RNOC 265 and not intended for PSPN 260. Recognizing this, for example, by the IP address within the data packets, PCU 215 routes the packetized data corresponding to the second message to the IP address of RNOC 265 through interfaces 280 and 270. Because the packetized data is placed on the system as though it were normal system traffic intended for PSPN 260, it is not necessary to dedicated resources, such as channels on a T-1 line, for operation and maintenance purposes.

By using for example TCP/IP, remote access to the nodes in wireless telecommunication system 100 may provided through equipment used for purposes in addition to providing remote access to nodes in telecommunication system 100. For example, if the existing event recorder and RNOC 265 are tied into telecommunication system 100 using TCP/IP, remote access between RNOC 265 and the existing event recorder may be facilitated without the need to purchase new equipment solely dedicated for establishing remote access.

Figure 3:
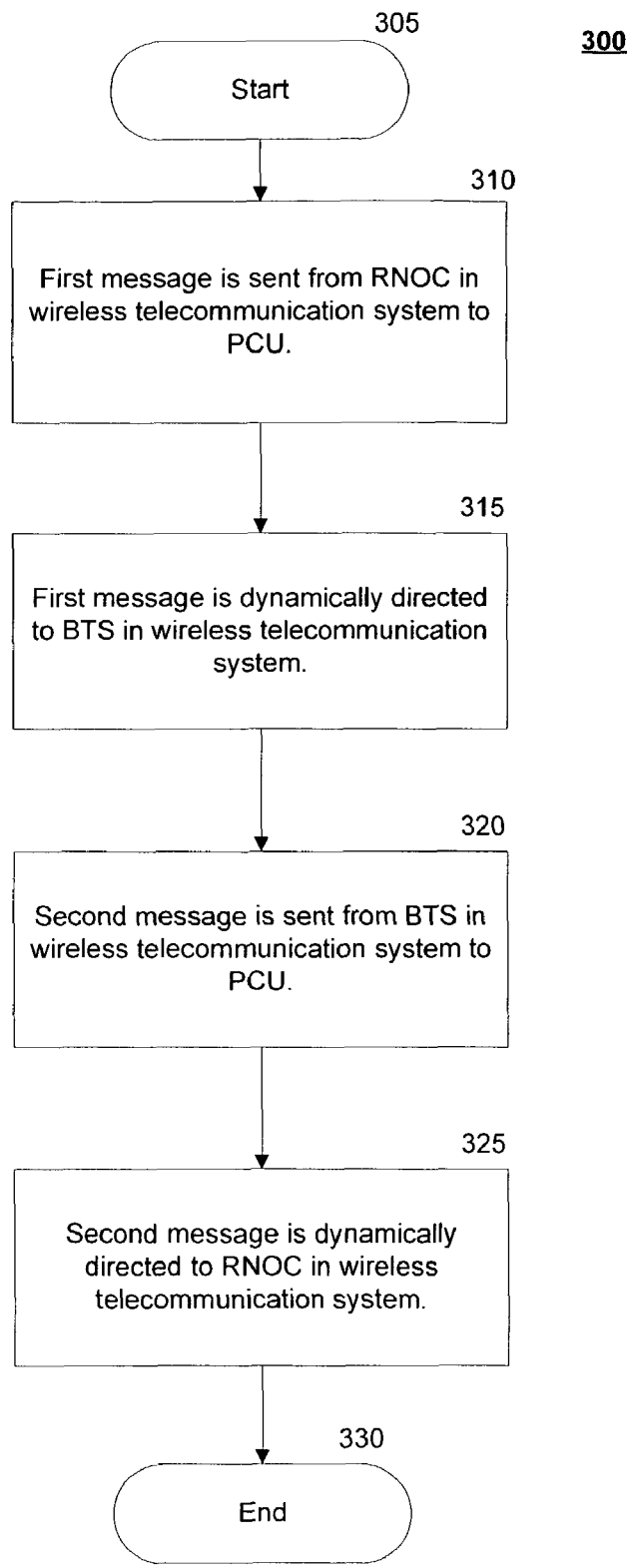
FIG. 3 is a flow chart of an exemplary method for providing remote access to nodes on a wireless telecommunication system consistent with an embodiment of the present invention.

FIG. 3 is a flow chart setting forth the general stages involved in an exemplary method 300 for providing remote access to nodes on a wireless telecommunication system. Exemplary method 300 begins at starting block 305 and proceeds to stage 310 where the first message is sent from RNOC 265 in wireless telecommunication system 100 to PCU 215. For example, software module 275 may be executed at RNOC 265 that creates the first message comprising a request from RNOC 265 that the event recorder at BTS 210 download data being stored in the event recorder. After the first message is created by software module 275, it may then be sent to interface 270 which passes the first message through interface 280 to PCU 215. PCU 215 may then pass the first message to BSC 205.

Once the first message is sent from RNOC 265 in wireless telecommunication system 100 to PCU 215 in stage 310, exemplary method 300 continues to stage 315 where the first message is dynamically directed to BTS 210 in wireless telecommunication system 100. For example, given that the first message contains the IP address of the event recorder in BTS 210, PCU 215 routes the first message to BTS 210 by dynamically directing the first message in at least one of a number of ways along the communication path between PCU 219 and BTS 210. For example, channels on T-1 lines or other communications links not allocated to normal subscriber traffic may be advantageously used by PCU 215 to route the first message to BTS 210. Similarly, channels on T-1 lines or other communications links allocated to normal subscriber traffic, but not presently active with subscriber traffic may also be used depending on when the first message is received.

In addition, the first message may be dynamically directed by PCU 215 to BTS 210 by intelligently using active and already allocated channels. For example, data packets corresponding to the first message may be placed in system 100 by PCU 215 in the same manner in which PCU 215 places data packets corresponding to normal subscriber traffic. Once the data packets corresponding to the first message reach BTS 210, they can be routed by their IP address to the event recorder. As an enhancement to the use of active channels, the data packets corresponding to the first message may be given a higher or lower priority with respect to data packets corresponding to normal subscriber traffic. For example, data packets corresponding to the first message may be given higher priority over data packets bound for MS 110' if the data packets bound for MS 110' correspond to an Internet web page in a WAP environment. This is because the delay of the web page data may be nearly undetectable by a subscriber. Moreover, if sending the first message in critical to the security or reliability of system 100, the first message may be justified in taking priority over all subscriber traffic.

After the first message is dynamically directed to the first node in wireless telecommunication system 100 stage 315, exemplary method 300 advances to stage 320 where the second message is sent from BTS 210 in wireless telecommunication system 100 to PCU 215. For example, once the event recorder at BTS 210 receives the first message requesting the event recorder to download its data, the event recorder can place the second message corresponding to the requested data onto system 100 as packetized data using TCP/IP. Moreover, this data can be placed on the wireless system as though it were packetized data being sent from, for example, MS 110' to a user of PSPN 260.

As the packetized data from the event recorder corresponding to the second message makes it way through system 100, it arrives at PCU 215. Packetized data from MS 110 corresponding to normal subscriber traffic passes through PCU 215 on its way to SGSN 245 and ultimately to PSPN 260. At PCU 215, however, the packetized data from the event recorder is recognized as data not intended for a user on PSPN 260, but rather for RNOC 265. This recognition may be realized by PCU 215 recognizing the IP address of data packets corresponding to the second message being the IP address of RNOC 265 and knowing that this IP address is not located on PSPN 260.

From stage 320 where the second message is sent from the first node in wireless telecommunication system 100 to PCU 215, exemplary method 300 advances to stage 325 where the second message is dynamically directed from one or more channels from BTS 210 to RNOC 265 in wireless telecommunication system. The second message may be dynamically directed to RNOC 265 in manner similar to how the first message was dynamically directed to BTS 210 as described above with respect to stage 315. From stage 325 where the second message is dynamically directed to RNOC 265 in wireless telecommunication system, exemplary method 300 ends at stage 335.

Those skilled in the art will appreciate that multiple messages may be sent from, for example, RNOC 265 to BTS 210, and from BTS 210 to RNOC 265. Furthermore, those skilled in the art will appreciate, for example, during regular operations, BTS 210 may store abnormal events that have taken place. Specifcally, hardware and software designers may use messages sent between RNOC 265 and BTS 210 to troubleshoot or fix systems using event logs that have recorded buffer overflows or protocol errors, for example. In addition, the messages exchanged may be used, for example, for changing the database from 1900 Mhz. to 800 Mhz, changing a terminal endpoint identifier (TEI), adding, removing, or changing external alarms, or triggering an internal reset.

It will be appreciated that a system in accordance with an embodiment of the invention can be constructed in whole or in part from special purpose hardware or a general purpose computer system, or any combination thereof. Any portion of such a system may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. An improved method for providing remote access to nodes in a wireless telecommunication system, the method comprising:
   sending a message from an operations node in the wireless telecommunication system to a packet interface, the message comprising a request for information relative to at least one of changing a database from a first frequency to a second frequency, changing a terminal endpoint identifier (TEI), and triggering an internal reset; and
   dynamically directing the message to a node in the wireless telecommunication system via one of a plurality of non-dedicated channels, wherein the plurality of non-dedicated channels comprise non-dedicated channels selected from a group of non-dedicated channels consisting of:
   (I) an unallocated channel;
   (II) an allocated, inactive channel; and
   (III) an allocated, active channel.

2. The method of claim 1, wherein dynamically directing the message to the node in the wireless telecommunication system via the active channel further comprises prioritizing the message in the active channel.

3. The method of claim 1, wherein dynamically directing the message to the node in the wireless telecommunication system via one of the plurality of non-dedicated channels is provided through equipment used for purposes in addition to providing remote access to the nodes in the wireless telecommunication system.

4. The method of claim 1, wherein the message comprises packetized data.

5. The method of claim 1, wherein the node is a base transceiver station (BTS).

6. The method of claim 1, wherein the operations node is a network operation center (NOC).

7. The method of claim 1, wherein the packet interface comprises a packet control unit (PCU).

8. The method of claim 1, wherein the wireless telecommunication system includes general packet radio service (GPRS).

9. The method of claim 1, wherein the message further includes information relative to at least one of adding an external alarm, removing an external alarm, and changing an external alarm.

10. The method of claim 1, wherein the message further comprises a request for information relevant to an operation of the node.

11. An improved method for providing remote access to nodes in a wireless telecommunication system, the method comprising:
    sending a message from a node in the wireless telecommunication system to a packet interface, the message comprising a response to a request for information relative to at least one of changing a database from a first frequency to a second frequency, changing a terminal endpoint identifier (TEI), and triggering an internal reset; and
    dynamically directing the message to an operations node in the wireless telecommunication system via one of a plurality of non-dedicated channels, wherein the plurality of non-dedicated channels comprise non-dedicated channels selected from a group of non-dedicated channels consisting of:
(I) an unallocated channel;
(II) an allocated, inactive channel; and
(III) an allocated, active channel.

12. The method of claim 11, wherein dynamically directing the message to the operations node in the wireless telecommunication system via the active channel further comprises prioritizing the message in the active channel.

13. The method of claim 11, wherein dynamically directing the message to the operations node in the wireless telecommunication system via one of the plurality of non-dedicated channels is provided through equipment used for purposes in addition to providing remote access to the nodes in the wireless telecommunication system.

14. The method of claim 11, wherein the message further comprises a request for information relevant to an operation of the node.

15. An improved system for providing remote access to nodes in a wireless telecommunication system, the improved system comprising:
an operations node configured for sending a message to a node in the wireless telecommunication system, the message comprising a request for information relative to at least one of changing a database from a first frequency to a second frequency, changing a terminal endpoint identifier (TEI), and triggering an internal reset; and
a packet interface in communication with the operation node, the packet interface configured for receiving the message from the operations node and dynamically directing the message to the node in the wireless telecommunication system via one of a plurality of non-dedicated channels, wherein the plurality of non-dedicated channels comprise non-dedicated channels selected from a group of non-dedicated channels consisting of:
(I) an unallocated channel;
(II) an allocated, inactive channel; and
(III) an allocated, active channel.

16. The system of claim 15, wherein the packet interface is further configured for prioritizing the message in the active channel.

17. The system of claim 15, wherein the non-dedicated channel, by way of which the message is directed, is used for purposes in addition to providing remote access to the nodes in the telecommunication system.

18. The system of claim 17, wherein the non-dedicated channel, by way of which the message is directed, is a channel capable of transmitting data via general packet radio service (GPRS).

19. The system of claim 15, wherein the message comprises packetized data.

20. The system of claim 15, wherein the node is a base transceiver station (BTS).

21. The system of claim 15, wherein the operations node is a network operation center (NOC).

22. The system of claim 15, wherein the packet interface comprises a packet control unit (PCU).

23. The system of claim 15, wherein the message further includes information relative to at least one of adding an external alarm, removing an external alarm, and changing an external alarm.

24. The system of claim 15, wherein the message further comprises a request for information relevant to an operation of the node.

25. A non-transitory computer-readable medium on which is stored a set of instructions for providing remote access to nodes in a wireless telecommunication system, which when executed perform steps comprising:
sending a message from an operations node in the wireless telecommunication system to a packet interface, the message comprising a request for information relative to at least one of changing a database from a first frequency to a second frequency, changing a terminal endpoint identifier (TEI), and triggering an internal reset; and
dynamically directing the message to a node in the wireless telecommunication system via one of a plurality of non-dedicated channels, the plurality of non-dedicated channels comprise non-dedicated channels selected from a group of non-dedicated channels consisting of:
(I) an unallocated channel;
(II) an allocated, inactive channel; and
(III) an allocated, active channel.

26. The computer-readable medium of claim 25, wherein dynamically directing the message to the node in the wireless telecommunication system via the active channel further comprises prioritizing the message in the active channel.

27. The computer-readable medium of claim 25, wherein dynamically directing the message to the node in the wireless telecommunication system via one of the plurality of non-dedicated channels is provided through equipment used for purposes in addition to providing remote access to the nodes in the wireless telecommunication system.

28. The computer-readable medium of claim 25, wherein the message comprises packetized data.

29. The computer-readable medium of claim 25, wherein the node is a base transceiver station (BTS).

30. The computer-readable medium of claim 25, wherein the operations node is a network operation center (NOC).

31. The computer-readable medium of claim 25, wherein the packet interface comprises a packet control unit (PCU).

32. The computer-readable medium of claim 25, wherein the wireless telecommunication system includes general packet radio service (GPRS).

33. The computer-readable medium of claim 25, wherein the message further includes information relative to at least one of adding an external alarm, removing an external alarm, and changing an external alarm.

34. The computer-readable medium of claim 25, wherein the message further comprises a request for information relevant to an operation of the node.

* * * * *